US007487296B1

(12) United States Patent
Iacobovici et al.

(10) Patent No.: US 7,487,296 B1
(45) Date of Patent: Feb. 3, 2009

(54) MULTI-STRIDE PREFETCHER WITH A RECURRING PREFETCH TABLE

(75) Inventors: Sorin Iacobovici, San Jose, CA (US); Sudarshan Kadambi, Sunnyvale, CA (US); Yuan C. Chou, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 355 days.

(21) Appl. No.: 11/062,266

(22) Filed: Feb. 17, 2005

Related U.S. Application Data

(60) Provisional application No. 60/546,386, filed on Feb. 19, 2004.

(51) Int. Cl.
*G06F 12/06* (2006.01)
(52) U.S. Cl. ...................... 711/137; 712/207
(58) Field of Classification Search .............. 711/137; 712/207
See application file for complete search history.

(56) References Cited

U.S. PATENT DOCUMENTS

| 5,357,618 | A | * | 10/1994 | Mirza et al. ............... 711/3 |
| 5,379,393 | A | * | 1/1995 | Yang ....................... 711/3 |
| 5,640,526 | A | * | 6/1997 | Mahin et al. ............... 712/207 |
| 5,649,144 | A | * | 7/1997 | Gostin et al. .............. 711/220 |
| 5,664,147 | A | * | 9/1997 | Mayfield ................... 711/137 |
| 5,829,028 | A | * | 10/1998 | Lynch et al. ............... 711/126 |
| 6,047,363 | A | * | 4/2000 | Lewchuk ................... 711/213 |
| 6,070,230 | A | * | 5/2000 | Capps ...................... 711/137 |
| 6,076,151 | A | * | 6/2000 | Meier ....................... 711/171 |
| 6,134,643 | A | * | 10/2000 | Kedem et al. .............. 711/213 |
| 6,138,212 | A | * | 10/2000 | Chiacchia et al. ......... 711/137 |
| 6,311,260 | B1 | * | 10/2001 | Stone et al. ............... 711/213 |
| 6,516,389 | B1 | * | 2/2003 | Uchihori ................... 711/137 |
| 6,584,549 | B2 | * | 6/2003 | Abdallah et al. ........... 711/137 |
| 2003/0009623 | A1 | * | 1/2003 | Arimilli et al. ............ 711/119 |
| 2003/0065890 | A1 | * | 4/2003 | Lyon ........................ 711/141 |
| 2003/0225977 | A1 | * | 12/2003 | Desai et al. ............... 711/137 |
| 2005/0138628 | A1 | * | 6/2005 | Bradford et al. .......... 718/107 |

OTHER PUBLICATIONS

Sair et al. "A Decoupled Predictor-Directed Stream Prefetching Architecture." IEEE Transactions on Computers. vol. 52. No. 3. Mar. 2003, pp. 260-276.*
Wu et al. "Value-Profile Guided Stride Prefetching for Irregular Code." Intel Programming Systems Research Lab. Intel Compiler Lab. pp. 307-324. 2002.*
Iacobovici et al. "Effective Stream-Based and Execution-Based Data Prefetching." ICS'04. Jun. 26-Jul. 1, 2004, pp. 1-11.*

* cited by examiner

*Primary Examiner*—Gary J Portka
*Assistant Examiner*—Shawn Eland
(74) *Attorney, Agent, or Firm*—Gunnison, McKay & Hodgson, L.L.P.; Forrest Gunnison

(57) ABSTRACT

A multi-stride prefetcher includes a recurring prefetch table that in turn includes a stream table and an index table. The stream table includes a valid field and a tag field. The stream table also includes a thread number field to help support multi-threaded processor cores. The tag field stores a tag from an address associated with a cache miss. The index table includes fields for storing information characterizing a state machine. The fields include a learning bit. The multi-stride prefetcher prefetches data into a cache for a plurality of streams of cache misses, each stream having a plurality of strides.

39 Claims, 9 Drawing Sheets

MULTI-STRIDE PREFETCHER WITH A RECURRING PREFETCH TABLE

RELATED APPLICATIONS

This application claims the benefit of U.S. Provisional Application No. 60/546,386 filed Feb. 19, 2004 entitled "Prefetch Mechanism for Recurring Memory Accesses" and naming Sorin Iacobovici, Sudarshan Kadambi, and Yuan C. Chou as inventors, which is incorporated herein by reference in its entirety.

BACKGROUND OF THE INVENTION

1. Field of the Invention

The present invention relates generally to cache performance, and more particularly to hardware pre-fetching.

2. Description of Related Art

Hardware prefetching schemes attempt to reduce the number of cache missing memory operations observed by an application by predicting the application's data requirements and using the predictions to bring that data closer to the processor. Ideally, the required data is already available in the processor's caches, when the data is eventually requested by the application. This reduces the time the application spends stalled waiting for data and improves application performance.

To function effectively, hardware prefetchers require sufficient information about the behavior of the application to be able to accurately predict what to prefetch. The prediction mechanisms used by prior art hardware prefetch schemes can be used to classify the schemes into three basic categories: observation schemes; speculative execution schemes; and application assistance schemes.

Observational schemes function by observing the behavior of the executing applications and monitoring an event such as cache misses or cache block utilization. Using this information, the hardware prefetchers attempt to predict which data the application is likely to require in the near future. This category can be further subdivided by considering the mechanisms used to derive prefetch predictions from the observational data.

For applications with structured workloads, such as high-performance and technical computing applications, there is a significant probability that there will be a regular displacement between subsequent missing memory operations (especially when considered with respect to cache line granularity). Stride prefetchers exploit this phenomena, and, by observing the "stride" between subsequent cache misses, predict that this relative displacement between misses will continue, allowing the prefetcher to speculatively prefetch for misses further in the stream.

The simplest stride prefetcher is a unit stride prefetcher. The unit stride prefetcher predicts, given misses for sequential cache lines (ascending or descending), that the subsequent cache lines will also be required, i.e., after observing misses for cache lines L and L+1, the unit stride prefetcher issues prefetches for cache lines L+2, L+3 etc.

More sophisticated stride prefetchers can deal with non-units strides, e.g., a miss for line L, followed by a miss for line L+4. However, with applications concurrently accessing multiple streams, the misses from many independent streams may be interleaved, making the detection of strides problematic.

Stride detection is addressed in two distinct fashions. If the hardware prefetcher has access to the program counter of the cache missing memory operation, misses can be attributed to specific instructions and streams are tracked on a per program counter basis. However, the program counter of the memory operation, which caused the cache miss, is not typically conveyed with the miss request (and it is the sequence of requests that is monitored by the hardware prefetcher). Consequently, prediction schemes that require program counter information can represent significant additional cost and complexity due to the requirement to make this information available to the prefetcher. As a result, several schemes have been proposed to perform this disambiguation without requiring access to program counter information, including minimum delta prediction and the partitioning of memory into regions, with all misses falling within a single region attributed to a single stream.

Stride prefetchers support a single constant stride for each stream, the stride typically being determined during the initial training phase of the prefetcher. Techniques such as a 2-delta stride prediction are frequently leveraged to prevent single "erroneous" misses from causing the stride predictor to deviate from the correct stride. Stride prefetchers also usually leverage techniques to temporarily delay and/or limit prefetching until the stride prefetcher becomes more certain that a new stream has been identified.

Context-based prediction schemes are capable of handling more unstructured behavior, essentially functioning by remembering sequences of past events and prefetching if a sequence is observed to begin repeating. Consequently, these schemes require that the pattern of misses be observed at least once before prefetching can be performed. The events monitored to drive the prefetch predictions vary greatly and can range from the memory addresses of the individual missing memory operations to the eviction and replacement of cache lines or cache tags.

Execution driven schemes function by speculatively executing ahead of the main thread of execution in an attempt to prefetch cache missing memory accesses, such that data is instantiated in the processor's caches in advance of the main thread of execution requiring the data. Execution driven schemes are frustrated by dependent misses. Distributed misses can be problematic, as the speculative execution may never progress far enough ahead to locate the next miss. The memory addresses of dependent misses are dependent on previous missing loads, preventing determination of the memory addresses and execution of the operation.

Application assisted hardware prefetchers derive prefetch information directly from the application. During compilation, in addition to generating the standard application binary, the compiler generates a distilled version of the application, which retains only the instructions necessary to generate the memory addresses of the data to be prefetched. Portions of this distilled application are periodically supplied, by the executing application, to the hardware prefetcher, which executes the code to determine which memory addresses to prefetch.

SUMMARY OF THE INVENTION

In one embodiment of the present invention, a processor includes a cache and a multi-stride prefetcher coupled to the cache. The multi-stride prefetcher fetches information into the cache for both streams of addresses, for cache misses, with a plurality of strides and other streams of addresses, for cache misses, having a single stride. In one example, the cache is a data cache.

The multi-stride prefetcher includes a state machine having a plurality of states where, in one example, the plurality of states is two states. This state machine is also used for the single stride stream.

In one embodiment, the multi-stride prefetcher includes a recurring prefetch table that in turn includes a stream table and an index table. In one embodiment, the stream table is implemented in a content-addressable memory, and in another embodiment is implemented in a set associative memory.

The stream table includes a memory structure having a valid field and a tag field. The memory structure also includes a thread number field to support multi-threaded processor cores. The tag field stores a tag from a virtual address in one embodiment and in another embodiment, the tag field stores a tag from a physical address.

The index table includes a memory structure that in turn includes fields for storing information characterizing a state machine. The memory structure further includes a learning bit.

In another embodiment, the multi-stride prefetcher includes a recurring prefetch table coupled to a tag field of an address. For multi-threaded support, the recurring prefetch table is also coupled to a thread number storage element. An adder includes a first input coupled to an index field of the address; a second input coupled to the recurring prefetch table; and an output. A prefetch address storage element includes a prefetch tag field coupled to the tag field and an index field coupled to the output of the adder.

In still yet another embodiment, a multi-stride prefetcher includes means for determining upon a cache miss whether a tag in an address for which the cache miss corresponds matches a stored tag in the recurring prefetch table; and means for generating a prefetch address upon the means for determining finding an entry in the recurring prefetch table having the stored tag and a prediction state associated with that entry.

The multi-stride prefetcher also includes means for allocating a new entry in the recurring prefetch table upon the means for determining failing to find an entry in the recurring prefetch table having the stored tag, and means for updating training for an entry having the stored tag upon the means for determining finding the entry in the recurring prefetch table having the stored tag and a learning state associated with that entry.

In still yet a further embodiment, a multi-stride prefetcher includes means for determining, upon a cache miss or a cache hit on an entry having a prefetch tag asserted, whether a tag, in an address associated with the cache access, matches a stored tag in an entry of a recurring prefetch table; means for training of the entry upon finding the entry by the means for determining, if the entry is in the learning mode; and means for issuing a prefetch upon finding the entry by the means for determining, if the entry has finished training.

A method for multi-stride prefetching includes determining, upon a cache miss or a cache hit on an entry having a prefetch tag asserted, whether a tag, in an address associated with the cache access, matches a stored tag in a recurring prefetch table, and generating a prefetch address upon the determining finding an entry in the recurring prefetch table having the stored tag and a prediction state associated with that entry.

This method also includes allocating a new entry in the recurring prefetch table upon the determining failing to find an entry in the recurring prefetch table having the stored tag, updating training for an entry having the stored tag upon the determining finding the entry in the recurring prefetch table having the stored tag and a learning state associated with that entry.

Another embodiment of the method includes:
determining upon a cache miss whether a tag, in an address for which the cache miss corresponds, matches a stored tag in an entry of a recurring prefetch table;
training of the entry upon finding the entry in the determining, if the entry is in the learning mode; and
issuing a prefetch upon finding the entry in the determining, if the entry has finished training.

BRIEF DESCRIPTION OF THE DRAWINGS

In the drawings and following description, elements with the same reference numeral are the same or similar elements. Also, the first digit of a reference numeral for an element is the figure number in which that element first appeared.

DETAILED DESCRIPTION

Figure 1:
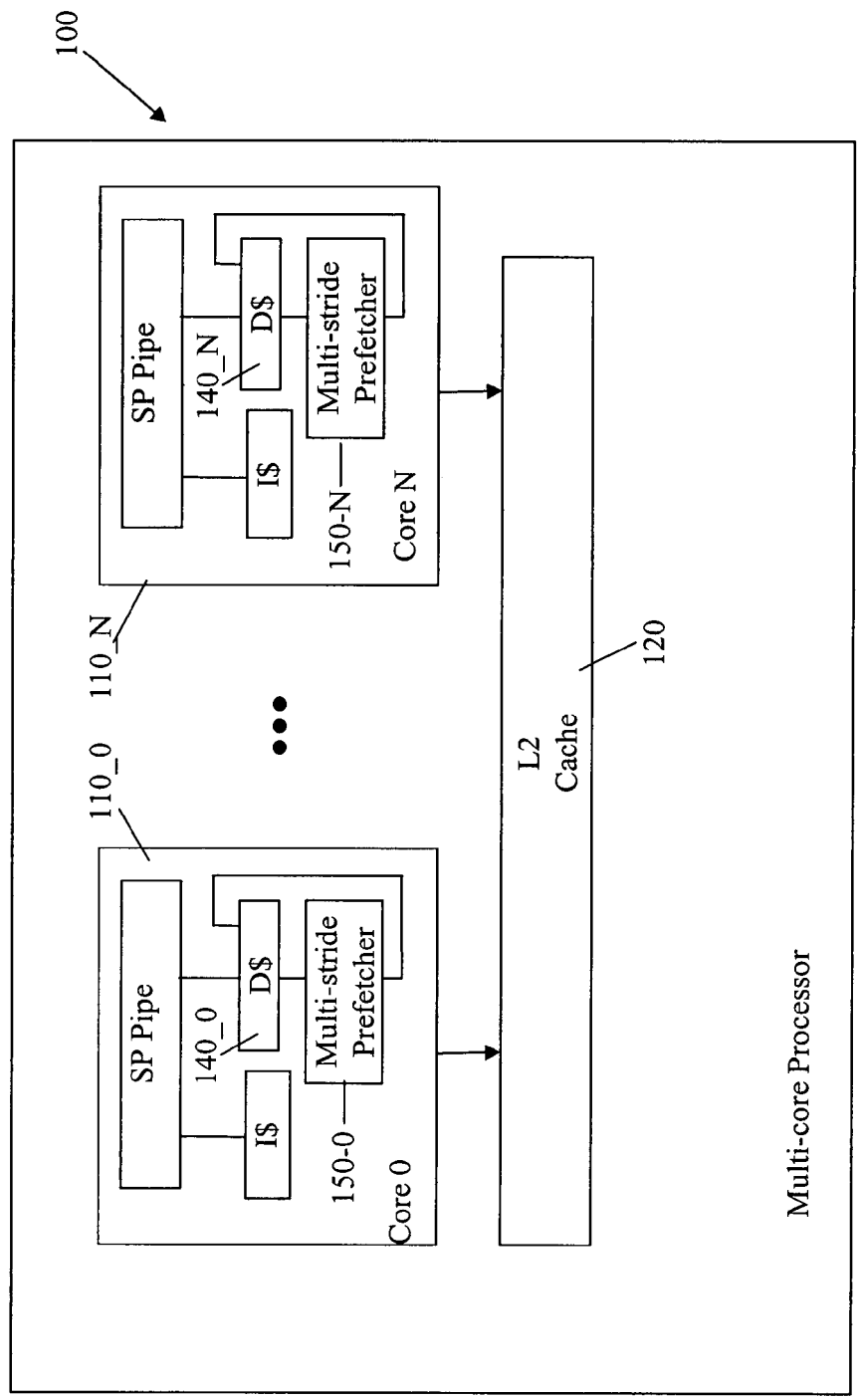
FIG. 1 is a block diagram of a processor that includes a multi-stride prefetcher according to one embodiment of the present invention.

FIG. 1 is a block diagram of part of a processor 100 that includes (N+1) processor cores 110_0 to 110_N. Each processor core 100_i, where i ranges from zero to N, includes a pipe, a data cache 140_i coupled to the pipe, and a multi-stride prefetcher 150_i coupled to data cache 140_i. Processor 100 is multi-threaded, multiple cores with multiple threads per core, and so there can be multiple recurrent accesses to the data caches happening at the same time.

Given the complex behavior of streams, prior art stride prefetchers, which only supported a single stride in a stream, were insufficient to correctly predict the behavior of some streams in processors such as processor 100. In one embodiment of this invention, a hardware multi-stride prefetcher 150_i (FIG. 1) correctly predicts these more complex streams and prefetches data into data cache 140_i. Specifically, the multi-stride prefetcher prefetches data into a cache for a plurality of streams of cache misses, each stream having a plurality of strides.

Thus, hardware multi-stride prefetcher 150_i prefetches data for a stream having a plurality of strides, e.g., four different strides or two different strides. In addition, multi-stride prefetcher 1501 also correctly handles streams with a single stride.

As explained more completely below, for a cache miss, multi-stride prefetcher 150_1 first determines whether multi-stride prefetcher 150_i has been previously trained for this particular cache miss. If multi-stride prefetcher 150_i has been trained, the predicted data is prefetched and placed in data cache 140_i for that particular stream, independent of whether the stream includes a single stride, or a plurality of strides.

Also, as explained more completely below, when a line of data is placed in the data cache by multi-stride prefetcher 150_i, the line, in one implementation, is tagged as prefetched data. When that line is subsequently used for the first time, the asserted prefetch tag in the line causes multi-stride prefetcher 150_i to prefetch additional data and place the data in the data cache.

In one application, multi-stride prefetcher 150_i utilizes a prefetch mechanism for recurrent loads, examples of such loads are found in computer code having reasonably tight loops that are found for example in vector operations, sparse matrix operations, tree traversal among others. Also, in some situations, loads used in pointer chasing, linked-list traversal, etc. may be predicted by multi-stride prefetcher 150_i. In general, the success obtained with multi-stride prefetcher 150_i depends on the particular code characteristics, heuristics, and data layout in memory. Recurrent computer code exhibits dependencies between loads (the address of one load depends on the previous load's data) and, as such, the addresses for the loads cannot be easily predicted.

On the other side, the computer code generating these loads is, usually, a reasonably small loop. For cache addresses associated with such a loop, while the addresses are dependent, the next line's address can be predicted from the current lines address using a state machine that is described more completely below.

While recurrent loads and a data cache are used as examples herein, this is illustrative only and is not intended to limit the application to this specific embodiment. In view of this disclosure, a multi-stride prefetcher can be used in any situation where the addresses for cache misses exhibit a recurrent pattern.

Figure 2:
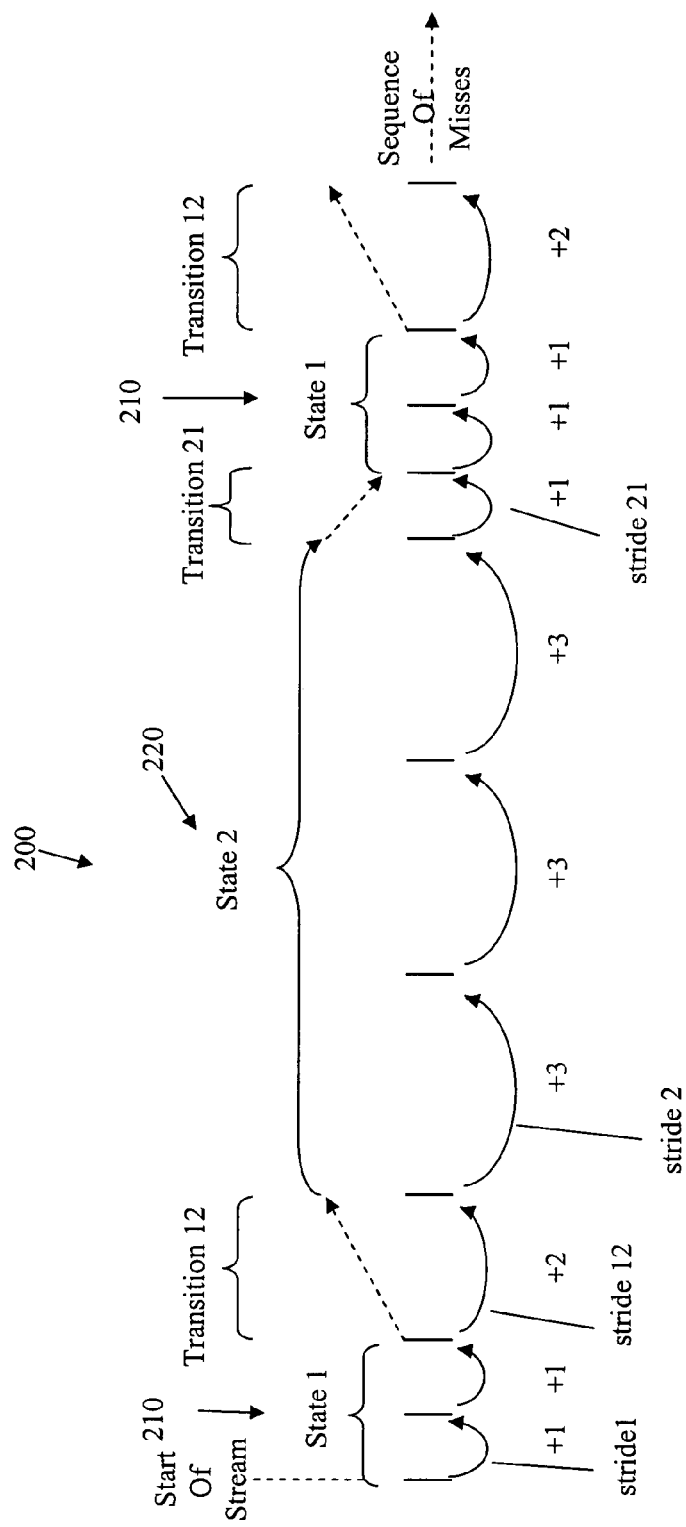
FIG. 2 is an illustration of characteristics of a recurring miss pattern for a cache, which is processed by the multi-stride prefetcher of FIG. 1, according to one embodiment of the present invention.

Prior to considering, hardware prefetcher 150_i in more detail, it is helpful to understand the characteristics of a stream with a recurring pattern of behavior, i.e., with a plurality of strides. In particular, FIG. 2 is an illustration of a stream 200 that includes two steady-state strides stride1, stride2 and two transitional strides stride12, stride21. In stream 200, stride stride1 has an offset of one; stride stride21 has an offset of two; stride stride2 has an offset of three; and stride stride21 has an offset of one.

In the example of FIG. 2, hardware prefetcher 150_i, in a predication state, remains in a first state 210 with stride stride1 for two iterations, e.g., for a first number of iterations, before transitioning with stride stride12 to a second state 220. Stream 200 remains in state 220 with stride stride2 for three iterations, e.g., for a second number of iterations, before transitioning with stride stride21 back to state 210.

While hardware prefetcher 150_i handles streams with multiple strides, such as stream 200, this is achieved without sacrificing single-stride performance. Single-stride streams account for the majority of streams and retaining good single-stride performance is imperative to good prefetcher performance.

Multi-stride prefetcher 150_i uses a partitioning scheme. The partitions are predefined using a portion of the physical address, referred to herein as "tag bits," and for multi-threaded support a thread number. Alternatively, the virtual address could be used.

Consequently, a memory address 310 (FIG. 3) is split into a tag 311, an index 312 (which refers to the cache line's position within the region identified by the tag bits), and a cache line offset 313. Address 310 is stored in a storage element. For a physical address, tag 311 is generally the physical page number. All missing memory operations with the same tag bits, e.g., the same tag, are considered to form part of the same stream. Thus, the tag defines the memory partition.

In some situations, there could be multiple recurrent accesses going on at the same time, but the number of recurrent accesses is, usually, fairly small. In this example, there are 13 bits for the index plus the line offset. Assuming, the index is 7 bits in size, e.g., bits 6 to 12, the tag covers up to 8 kilobytes of data. If this is too large an area for multi-stride prefetcher 150_i to work effectively, bit 12, for example, could be included in the tag, so that the area covered by the index was defined by six bits.

For a cache with a line size of 64 bytes, there are 128 data cache lines covered in the 8 kilobytes. The same tag could be in all 128 data cache lines, which is actually the case when a program accesses many consecutive operand addresses. Thus, there is a very high chance that many consecutive reoccurring addresses that normally miss in the data cache have the same tag bits, but different index bits. There is also a very strong probability that multiple recurrences in the same program use different tags.

Figure 3:
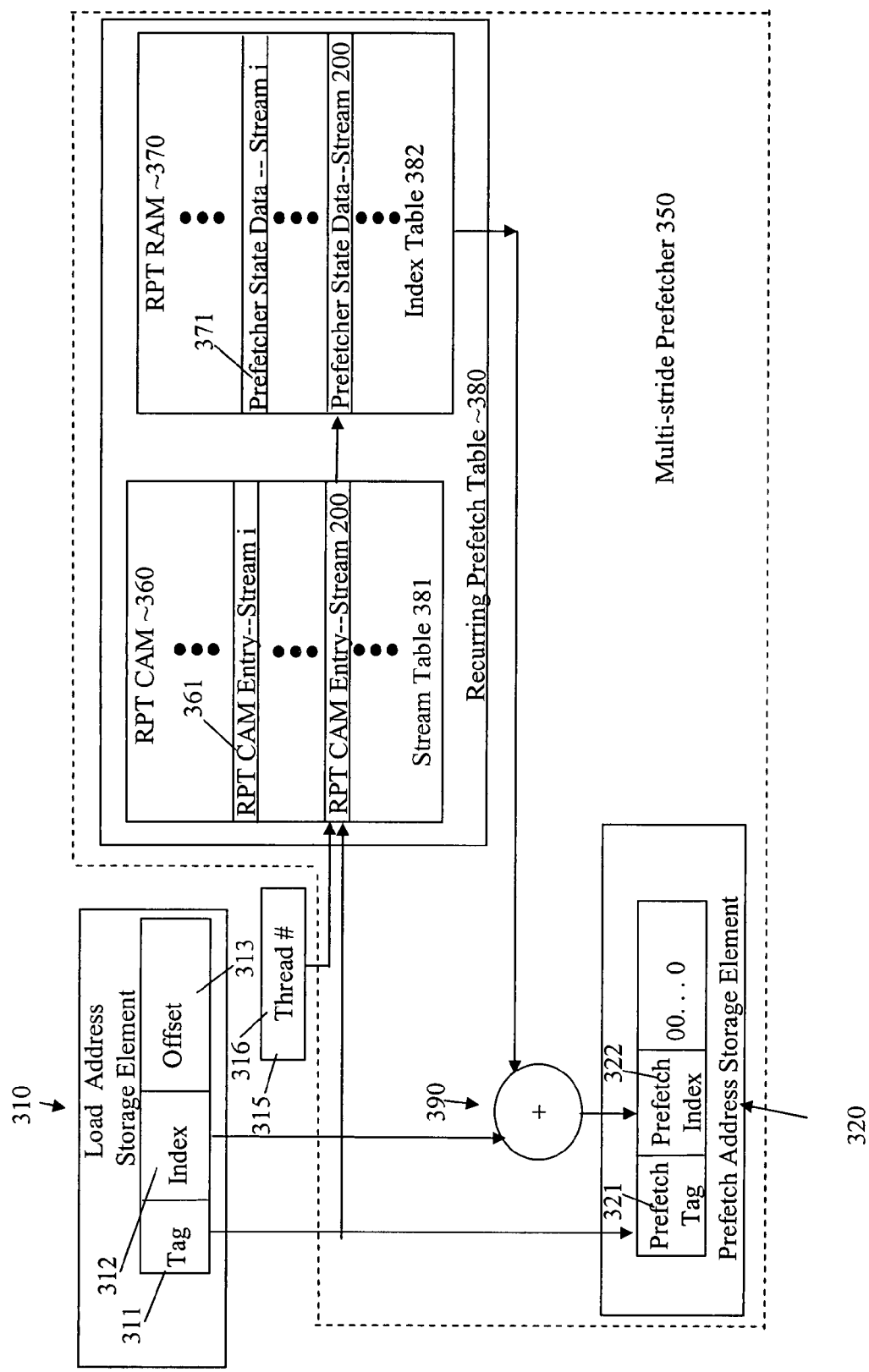
FIG. 3 is a diagram of one embodiment of the multi-stride prefetcher of FIG. 1.

FIG. 3 illustrates one embodiment of multi-stride prefetcher 150_i, i.e., multi-stride prefetcher 350. Multi-stride prefetcher 350 includes a recurring prefetch table 380 that, in turn, includes a stream table 381 and an index table 382. In this example, stream table 381 is a fully associative structure, which contains one entry for each of the active recurrent multi-stride streams, such as stream 200. Thus, in the example of FIG. 3, stream table 381 is included in a recurring prefetch table content addressable memory 360. As explained more completely below, each entry stores an address tag 311 that is written to the entry during initialization and a thread number 316 from a thread number storage element 315 that also is written to the entry during initialization.

Index table 382, includes the state of multi-stride prefetcher 350 for each of the streams contained in stream table 381. Specifically, for each entry 361 in stream table 381 there is a corresponding entry 371 in index table 382. In the example of FIG. 3, index table 382 is included in a recurring prefetch table random access memory 370.

The state of multi-stride prefetcher 350 for a stream includes: the mode of multi-stride prefetcher 350, i.e., learning or trained, sometimes referred to as learning or prefetch; the total states for the stream; the current state of the stream; the stride associated with each of the states; the transitional strides required when moving between the states, if any; and an indication of how long to stay in each state before transitioning to an alternative state.

Figure 4A:
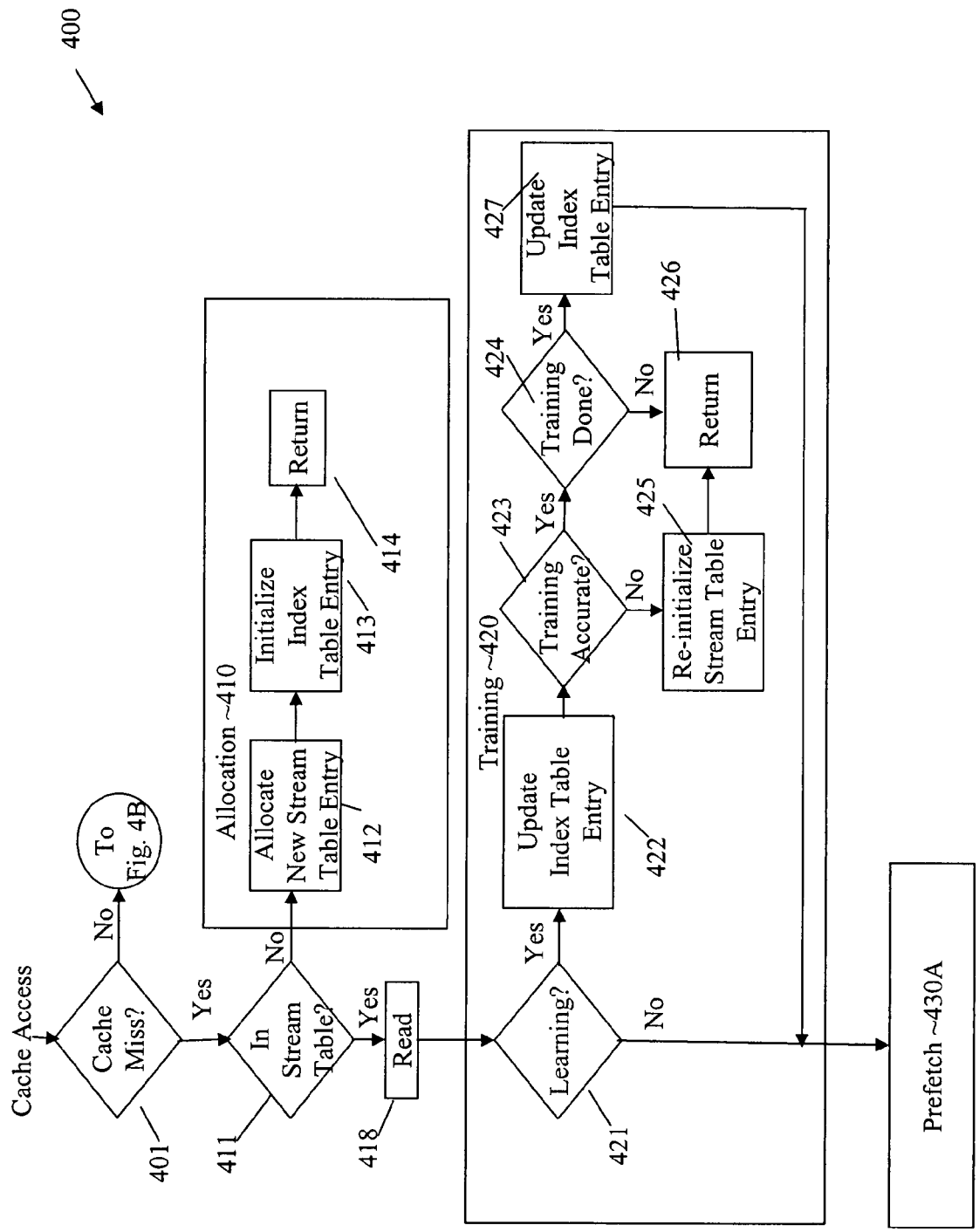
FIGS. 4A and 4B are a process flow diagram associated with aspects of the multi-stride prefetcher according to one embodiment of the present invention.
Figure 4B:
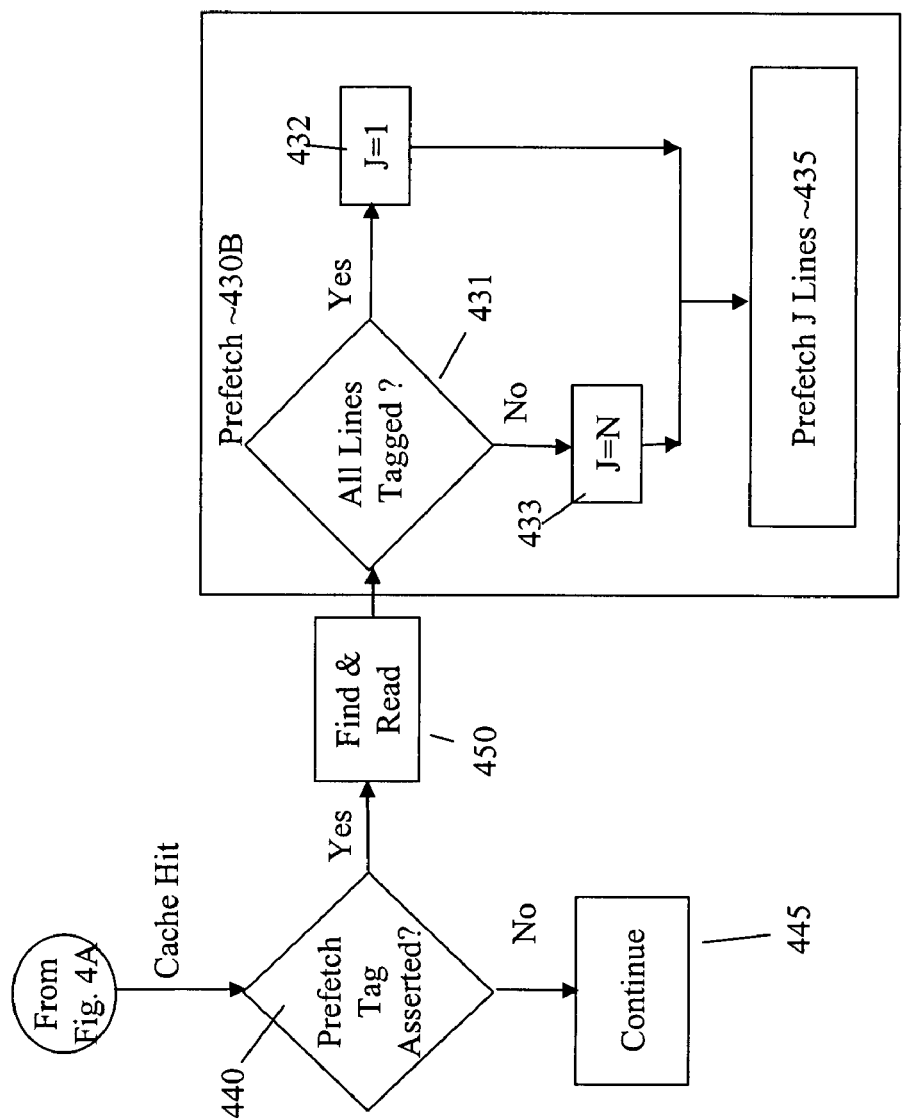

FIGS. 4A and 4B are a process flow diagram for a method 400. Method 400 is illustrated as linear sequential operations. This sequence is used for convenience only and is not intended to limit method 400 to the specific sequence illustrated. In view of this disclosure, those of skill in the art can rearrange the order of the operations, combine operations, use some operations only when needed, etc. to tailor multi-stride prefetcher 350 to their particular application. In particular, the processes shown on FIG. 4B, as explained more completely below, are associated with different implementations of the multi-stride prefetcher.

When there is a data cache access, cache miss check operation 401 (FIG. 4A) determines whether there was a cache hit or cache miss. If there was a cache hit, check operation 401 transfers to check operation 440 (FIG. 4B) that is discussed more completely below. If there was a cache miss, processing transfers from check operation 401 to in stream table check operation 411.

In check operation 411, stream table 381 is searched using tag 311 of memory address 310 and thread number 316 from element 315, in this example, for an entry with a matching stored tag and thread number. The use of both tag 311 and thread number 316 permits identifying a stream associated with a particular thread in a multi-threaded environment. If multi-stride prefetcher 350 is being used with a processor that is not multi-threaded, only tag 311 may be used.

If tag 311 and thread number 316 match a stored tag and stored thread number in an entry in stream table 381, e.g., entry 361, the match line in stream table 381 serves as a word line for an entry 371 in index table 382. When there is an entry, with a match between tag 311 and thread number 316 in stream table 381, e.g., entry 361, multi-stride prefetcher 350 reads the corresponding prefetcher state data entry in index table 382 in read operation 418. As explained more completely below, the action on the read data can be training via training operation 420, or alternatively prefetching via prefetch operation 430A.

As just described, the combination of the tag bits of the memory address and the thread number are used to search stream table 381, or alternatively, the tag bits are used. If tag 311 and thread number 316 fail to match any of entries with a valid tag and a thread number currently held in stream table 381, the miss is not considered to belong to any of the known streams and so check operation 411 transfers processing to allocation operation 410.

In allocation operation 410, allocate new stream table entry operation 412 allocates a new entry in stream table 381. Tag 331 and thread number 316 are stored in that entry, i.e., written to that entry, along with other information described more completely below. Operation 412 transfers processing to initialize index table entry operation 413.

In operation 413, the entry in index table 382 that corresponds to the newly allocated entry in stream table 381 is initialized. See miss 0 in Table 1 below for one example of initializing an index table entry. Index 312 of memory address 310 is written to a last index field LastIdx in the index table entry. Upon completion, operation 413 transfers processing to return operation 414, which terminates processing for this particular miss.

Subsequent misses with the same tag and thread number are considered to belong to the same stream and cause the training of multi-stride prefetcher 350 in training operation 420. Multi-stride prefetcher 350, after observing only a minimal number of misses, determines both the number and size of the strides associated with that stream in training operation 420.

In training operation 420, learning check operation 421 determines whether the entry read from index table 382 is in a learning state or a prediction state. If the entry is in a learning state, check operation 421 transfers processing to update index table entry operation 422.

Update table index entry operation 422 modifies the index table entry to reflect the current state characteristics of the stream. For example, the stream's initial stride, e.g., stride stride1 for stream 200, is determined by subtracting the value in last index field LastIdx from the index in the requested address for second miss. A state one count, which is a count of how long to remain in state one 210, is incremented and stored. The value in last index field LastIdx is replaced with the index in the requested address for the second miss.

Training accurate check operation 423 determines whether the data indicates that the misses for this tag are associated with recurrent accesses of a stream. If the data is not consistent with recurrent accesses of a stream, accesses of stream 200 for example, check operation transfers to re-initialize stream table entry operation 425 and otherwise to training done check operation 424.

Re-initialize stream table entry operation 425 resets the entry in stream table 381 to restart the training and transfers to return operation 426. Training done check operation 424 determines whether a training done indicator is true. If the training done indicator is true, training done check operation 424 transfers processing to update index table entry operation 427 that in turn marks the entry in index table 382 as in the prediction state and transfers to prefetch operation 430A. Alternatively, operation 427 could transfer to return 426. If the training done indicator is false, training done check operation 424 transfers to return 426. Training operation 420 is complete for this miss.

Assuming that training is not complete, if subsequent misses in the same stream continue to display an identical stride, multi-stride prefetcher 350 rapidly deduces that this stream appears to be a single stride stream. This occurs, for example, when the state one count exceeds a single stride confidence threshold so that training done check operation 424 transfers processing to update index table entry 427, which, as described above, causes the entry to transition from a learning state to a single stride prediction state.

If during training operation 420, a stride for a miss deviates from the expected stride, multi-stride prefetcher 350 recognizes that a multi-stride stream may have been detected and transitions to a second state. The stride for the miss that deviated from the expected stride is set to a transitional stride stride12 from the first state to the second state. The index for the next subsequent miss with this tag is used to generate stride stride2 that is associated with the second state.

The next miss with a stride that deviates from stride stride2 is assumed to represent a transition back to the first state. The observed stride is used to set the transitional stride stride21 from state two to state one.

Subsequent misses are expected to display stride one for stride one count iterations. For a multi-stride stream to transition from the learning state to the prediction state, multi-stride prefetcher 350 must correctly predict the stride associated with a predetermined number of misses. In one embodiment, a recurrent counter is used to track the correctly predicted misses for a multi-stride stream. The recurrent counter is updated, e.g., incremented after accurate prediction of one cycle of the multi-stride stream. Once the value of the recurrent counter passes a multi-stride confidence threshold, the entry is transitioned from the learning state to a multi-stride prediction state by operations 424 and 427. Failure of observed strides to match the predicted strides causes training accurate operation 423 to transfer to operation 425 and training is restarted.

Multi-stride prefetcher 350 also includes a counter, for each state, which saturates to a single-stride threshold value. If either of these counters reaches the single stride threshold value, the entry is transitioned from the learning state to a single-stride prediction state by operations 424 and 427

Once the behavior of a stream, e.g., single stride or multi-stride, has been learned by multi-stride prefetcher 350, following each subsequent compliant miss (compliant if the observed stride matches the predicted stride for the state), multi-stride prefetch 350 issues a number of prefetches for the stream in prefetch operation 430A. The stride of the issued prefetches is governed by the state of multi-stride prefetcher 350 and the stride associated with that state. When the sequence of issued prefetches spans multiple states, prefetches with different strides may be issued, enabling multi-stride prefetcher 350 to follow the predicted behavior of the stream.

In one implementation, prefetch operation 430A does N prefetches and does not use the prefetch tag. In another implementation, prefetch operation 430A does N prefetches, where N is a predetermined number of cache lines, and asserts the prefetch tag in all of the lines prefetched, or in an alternative implementation, does N prefetches and asserts the prefetch tag in only the first line prefetched. The implementation varies depending on the number of lines with the prefetch tag asserted when there is a cache hit as described more completely below. In one example, N is four.

As indicated above, if there was a cache hit, cache miss check operation 401 transfers processing to prefetch tag asserted check operation 440. If the prefetch tag is implemented, check operation 440 determines whether the line in the cache for which the hit occurred has the prefetch tag asserted. If the prefetch tag is not implemented, the operations illustrated in FIG. 4B are treated the same as when the prefetch tag is not asserted.

Assuming that the prefetch tag has been implemented, if the prefetch tag is not asserted, check operation 440 transfers to continue operation 445 and processing continues without accessing multi-stride prefetcher 350. However, if the prefetch tag is asserted, check operation 440 transfers processing to find and read operation 450.

In operation 450, the line in stream table 381 with a stored tag and thread number that matches the tag in the address for the cache hit and the thread number is found and the corresponding line in index table 382 is read. Operation 450 transfers to all lines tagged check operation 431 in prefetch operation 430B. Only one path through prefetch operation 430B is implemented in practice and so tagged check operation 431 along with operations 432 and 433 are presented to help illustrate the differences in the implementations.

If the prefetch tag was asserted in each of N lines in prefetch operation 430A (FIG. 4A), check operation 431 transfers to a first set operation 432 that sets J, a number of lines to be prefetched, to one. Conversely, if the prefetch tag was asserted in the first line of N prefetched lines in prefetch operation 430A (FIG. 4A), check operation 431 transfers to a second set operation 433 that, in turn, sets J to N. Both of operations 432 and 433 transfer to prefetch J lines operation 435 that in turn prefetches J lines into the data cache, and asserts the prefetch tag in the appropriate number of lines. Thus, depending on the implementation, for a cache hit on a line with the prefetch tag asserted the value of J is known and multi-stride prefetcher 350 prefetches either N lines or one line into the data cache. Thus, in practice, multi-stride prefetcher 350 does not perform operations 431 to 433, and instead just does the appropriate prefetch for the particular implementation.

Thus, when the prefetch tag is not implemented, multi-stride prefetcher 350 prefetches N lines for each cache miss associated with an entry in recurring prefetch table 380. If the implementation of multi-stride prefetcher 350 uses the prefetch tag, for each hit on a cache line having the prefetch tag asserted, multi-stride prefetcher 350 prefetches either one line or N lines depending on which embodiment is implemented.

Figure 5:
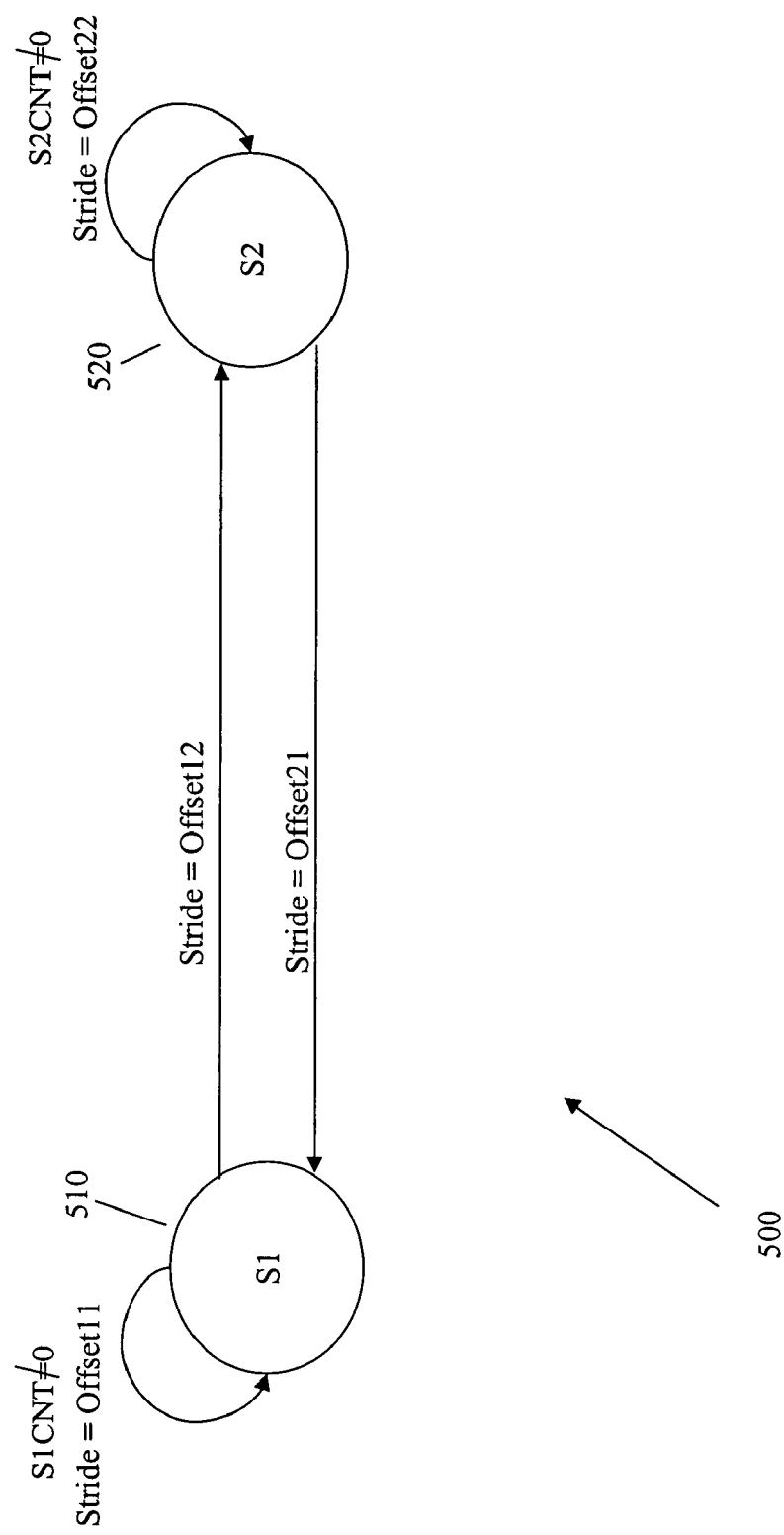
FIG. 5 is an illustration of a multi-stride state machine used by the multi-stride prefetcher according to one embodiment of the present invention.

FIG. 5 is a state diagram of a state machine 500 used by multi-stride prefetcher 350 for stream 200. In this example, multi-stride prefetcher 350 has been trained. State machine 500 was also initialized and used in training.

Prior to considering the operation of state machine 500 for a cache miss, the sequence of operations for a cache miss, with multi-stride prefetcher 350 trained, is briefly explained. Assume that multi-stride prefetcher 350 is not using the prefetch tag, and that multi-stride prefetcher 350 has prefetched N-lines into the data cache. Upon the prefetch of the N-lines, the information characterizing state machine 500 in index table 382 is updated to reflect the status after the prefetch of the N-th line.

On the next cache miss, multi-stride prefetcher 350 must verify that the cache miss is associated with the stream for the prior N prefetches. Multi-stride prefetcher 350 locates the proper entry in index table 382 and uses the information in table 382 to generate the expected index for the next address in the stream. This expected index is compared with index 312 for the cache miss. If the indexes match, a counter counting the number of iterations in a state is decremented, and the line in index table 382 is updated. While no line is prefetched, index table 382 is updated as though a line was prefetched. Multi-stride prefetcher 350 then fetches another N lines into the data cache based upon the updated line in index table 382.

Returning to the description of state machine 500 for a cache miss. On entry to a state, a current counter CrtCntr has been loaded with the number of iterations in that state as determined in the learning phase. State machine 500 has two states, state one 510 and state two 520. Thus, a number of states field StateCnt in index table 382 has been configured to indicate a two-state state machine. State machine 500 has four transitions: from state one to state one; from state one to state two; from state two to state two; and from state two to state one.

If state machine 500 is in state one 510 and the number recurrences in state one 510 for a single prefetch has not occurred, prefetch address 320 for a cache miss is the concatenation of: current address tag 311; an index 322 that is sum of current index 312 and a stride for state one, which is stored in an index offset stage-one-to-stage-one transition field Offset11; and NN bits with a value of zero. The number of bits NN set to zero is the same as the number of bits in line offset 313 of address 310.

Thus, the prefetch address includes a prefetch tag 321 and a prefetch index 322 in a storage element. The prefetch tag storage field of this storage element is coupled to a tag storage field, and the prefetch index storage field is coupled to the output of adder 390.

Index 322 in this address is compared with index 312 in the miss address. (Note that this comparison can be done without forming the address as just described since only the indexes are checked.) If there is a match, the next state is state one 510, current counter CrtCntr is decremented, and index 312 is stored in a last index field LastIdx. Multi-stride prefetcher 350 then prefetches the next line into the data cache based upon the updated information.

After the predefined number of iterations in state one 510, state machine 500 transitions to state two 520. For a single prefetch in the transition, prefetch address 320 for a cache miss is the concatenation of: current address tag 311; an index 322 that is a sum of current index 312 and a transitional stride from state one to state two, which is stored in an index offset stage-one-to-stage-two transition field Offset12; and NN hexadecimal zeros. Index 322 in this address is compared with index 312 in the miss address. If there is a match, the next state is updated to state two 520, and the value of current counter CrtCntr is loaded with S2$cnt$, which is the number of recurrences in state two 520. Multi-stride prefetcher 350 then prefetches the next line into the data cache based upon the updated information.

If state machine 500 is in state two 520 and the number of recurrences in state two 520 has not occurred, for a single prefetch on a cache miss, prefetch address 320 is the concatenation of: current address tag 311; an index 322 that is sum of current index 312 and a stride for state two, which is stored in an index offset stage-two-to-stage-two transition field Offset22; and NN hexadecimal zeros. Index 322 in this address is compared with index 312 in the miss address. If there is a match, the next state is state two 520, and current counter CrtCntr is decremented and index 312 is stored in a last index field LastIdx. Multi-stride prefetcher 350 then prefetches the next line into the data cache based upon the updated information.

After the predefined number of iterations in state two 520, state machine 500 transitions to state one 510. For a single prefetch on a cache miss in the transition, prefetch address 320 is the concatenation of: current address tag 311; an index 322 that is a sum of current index 312 and a transitional stride from state two to state one, which is stored in an index offset stage-two-to-stage-one transition field Offset21; and NN hexadecimal zeros. Index 322 in this address is compared with index 312 in the miss address. If there is a match, the next state is updated to state one 510, and the value of current counter CrtCntr is loaded with S1cnt, which is the number of recurrences in state one 521. Multi-stride prefetcher 350 then prefetches the next line into the data cache based upon the updated information.

Thus, for a multi-stride stream 200 with two states, multi-stride prefetcher 350 expects to issue S1cnt prefetches with stride stride1 in state one 510, before transitioning, with stride stride12 to state two 520. After issuing S2cnt prefetches with stride stride2 in state two 520, multi-stride prefetcher 350 transitions with stride stride21 back to state one 510.

The above description was for a cache miss. For a cache hit, the operation of state machine 500 is equivalent, but in generating the prefetch address instead of the value of the current index, the value in last index field LastIdx is used.

In the above example, state machine 500 transitioned between states with a specific stride. However, in another embodiment, when the number of recurrences S1cnt with stride stride1 in state one 510 has occurred, state machine 500 transitions to state two 520 and issues S2cnt prefetches with stride stride2. There are no transitional strides for this embodiment.

In one embodiment, stream table 381 is managed via a round-robin replacement policy, e.g., managed as a first in first out memory. Alternatively, more sophisticated replacement policies, such as least recently used, could be used.

Thus, when there is miss in the data cache, and a hit in stream table 381, the data in the word line of index table 382 corresponding to the line in stream table 381 with the matching tag and thread number is read. The action on the read data is either:

training of the entry if the entry is in the learning mode, i.e., in the process of determining if the accesses for that tag have a recurring pattern, and determining what is the state machine representing that recurring pattern; or a prefetch, if the entry has finished training and holds the state machine information of a recurring pattern.

In this example, stream table 381 in recurring prefetch table CAM 360 holds tags and thread numbers for data cache accesses exhibiting a recurring behavior and holds tags and thread numbers for data cache accesses that are in the process of being trained. Memory 360 is not required to be a content addressable memory. A set associative cache, for example, could also be used. In view of the disclosure and the recurring behavior for which the prefetches are performed, one of skill in the art can select a memory structure suitable for stream table 381.

In this example, a fully associative organization, i.e., recurring prefetch table CAM 360, was chosen based on the observation that execution of that computer code goes through a small number of tags, only a part of which miss in data cache 140_i, during the time training for those recurring prefetch table entries occurs. As such, a fairly small number of entries per thread, e.g., 8 or 16, should be sufficient. However, too few entries could result in entries in training being overwritten and prevent the identification of recurring patterns in the computer program.

Figure 6:
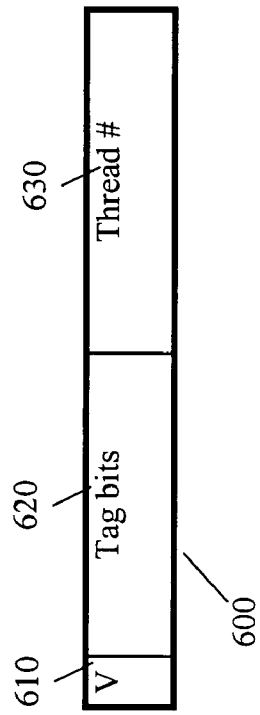
FIG. 6 is an illustration of a memory structure used in a stream table of the multi-stride prefetcher according to one embodiment of the present invention.

One example of a memory structure 600 for an entry in stream table 381 is illustrated in FIG. 6. The value in valid field 610 indicates either that entry 600 is in one of a training state or a prediction state, or is invalid. Thus, the valid field is means for indicating an entry in stream table 318 is one of (i) in a training state or a prediction state; and (ii) invalid. In one embodiment, valid field 610 is one bit in size.

Data cache tag field 620 stores the data cache address tag bits for the entry. Thus, data cache tag field is a means for storing a data cache tag for an entry in stream table 382. Assuming a 64-bit address and an 8 Kbyte stream size (and a page size equal to or larger than 8 Kbytes), tag field 620 can be as large as 51 bits, e.g., the bits of the address from bit 13 and above in the request's address.

However, a smaller field, for example, a 24-bit field, should provide sufficient size for all the tags for recurring addresses that might be prefetched. When using a tag in stream table 381, the tag bits do not need to start with bit thirteen of the address. Actually, where the tag starts is a function of the page size. For example, a maximum offset of ±32 lines allows only four accesses in recurring prefetch table 380 before going to another entry, which needs to be trained. Thus, the memory space covered by the tag stored in field 620 should be selected based upon the physical page size. A larger memory space decreases the training overhead associated with smaller offset values. A larger memory space, however, increases the chance that multiple streams have the same tag, which in turn prevents training and prefetching.

Note that the tags used in recurring prefetch table 380 do not have to be physical page numbers. Virtual address bits could be used, but unlike when using physical addresses, using a virtual address requires an address translation for the prefetch.

Thread field 630, stores a thread number that indicates the thread whose program executes the recurring memory addresses. Thus, field 630 is a means for storing a thread number, which indicates the thread whose program executes the recurring memory address. In one embodiment having four threads, thread number field 630 has a size of two bits.

As the processor core is multithreaded, there could be multiple recurrences happening simultaneously in the core's threads. To allow correct predictions for all these threads, the thread number is used as part of the tag in one embodiment, as indicated above. Alternatively, in the multithreaded mode, where up to four threads can be executing simultaneously, one quarter of recurring prefetch table 380 is allocated to each thread to prevent interference between the strands.

Figure 7:
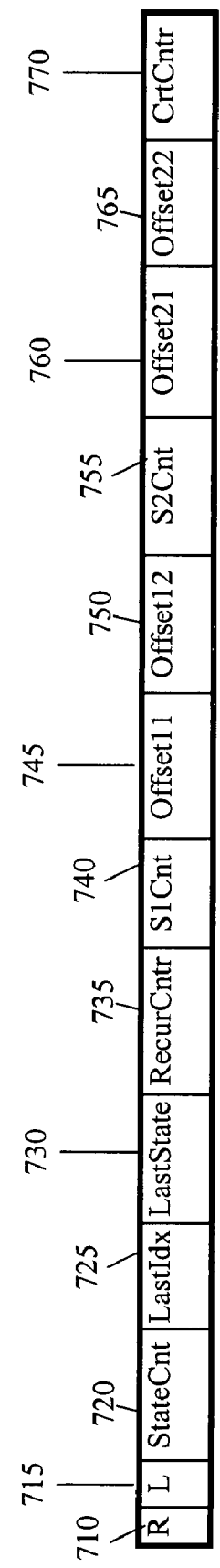
FIG. 7 is an illustration of a memory structure used in an index table of the multi-stride prefetcher according to one embodiment of the present invention.

Index table 382 in recurring prefetch table RAM 370 holds the state machine information and other data for data cache accesses exhibiting recurring behavior, or for the tags that are in the process of being trained. FIG. 7 is one embodiment of an illustration of a memory structure 700 for entries in index table 382. Memory structure 700 assumes a maximum of two-states for a recurring prefetch entry's state machine.

A value stored in recurring field 710 indicates that the recurring prefetch table holds a recurring tag. Thus, recurring field 710, in one embodiment, is a means for storing a value indicating that the recurring prefetch table holds a recurring tag. In one embodiment, recurring field 710 has a size of one bit. Use of field 710 is optional.

A value stored in learning field 715 indicates whether the entry is associated with a tag in the learning process, e.g., the entry is in the learning state, or the entry is associated with a tag for which the learning process is complete, e.g., the entry is in the prediction state. Thus, learning field 715, in one embodiment, is a means for storing a value indicating whether the entry is in a learning state or a prediction state. In one embodiment, learning field 715 has a size of one bit.

State count field 720 stores a value indicating whether the entry holds a one-state state machine, or a two-state state machine. Thus, state count field 715, in one embodiment, is a means for storing a value indicating whether the entry holds a one-state state machine, or a two-state state machine. In one embodiment, state count field 720 is one bit in size.

Last index field 725, sometimes referred to as last index field LastIdx, stores the index in the requested address for the data cache's last miss. This value is used during learning to generate the offset value. This value is also used to generate prefetch addresses when the implementation of multi-stride prefetcher 350 generates prefetches for hits on lines in the data cache having the prefetch tag asserted. Thus, last index field 725, in one embodiment, is a means for storing an index in the requested address for the data cache's last miss. In one embodiment, last index field 725 has a size of seven bits.

Last state field 730 stores the last state of the state machine. This value is used during learning, i.e., learning bit 715 is asserted, to generate the entry state machine's states. This value is used during prediction, i.e., learning bit 715 is de-asserted, to select the offset of the prefetch line and to predict the next state. In one embodiment, last state field 730 is a means for storing the last state of the state machine. In this example, last state field 730 is one bit in size.

The value in recurrent counter 735 indicates a trigger point for transition from learning mode to prediction mode for that entry for multi-stride patterns. Thus, recurrent counter 735, in this embodiment, is a means for indicating a trigger point for transition from learning mode to prediction mode for that entry for a multi-stride prefetch recurrent pattern. In this example, recurrent counter 735 is a three-bit counter.

State-one count field 740 holds a state count value that is generated during the learning mode, i.e., learning bit 715 is asserted, and unchanged during the prediction mode, i.e., learning bit 715 is de-asserted. This value indicates, in prediction mode, how long to stay in state one before predicting a transition to state two, if state two is defined for this entry. In this example, state-one count field 740 is three-bits in size. Thus, state-one count field 740 stores means for indicating, in prediction mode, how long to stay in state one before predicting a transition to state two.

State-one-to-state-one offset field 745 stores a stride for a state-one-to-state-one transition, i.e., is the index offset used in prediction mode for a state-one-to-state-one transition. In this example, field 745 is four bits in size with the most significant bit a sign bit, and is sign-extended to seven bits before calculating the prefetch address. In one example, the offset is limited from −8 lines to +8 lines, where each line is 64 bytes. Larger offsets result in the entry being released, e.g., recurring bit 710 is de-asserted and learning bit 715 is asserted in one embodiment. Thus, in one embodiment, field 745 is means for storing a stride that is used as an index offset for a state-one-to-state-one transition.

State-one-to-state-two offset field 750 stores a stride for a state-one-to-state-two transition, i.e., is the index offset used in prediction mode for a state-one-to-state-two transition. This field is valid only when the value stored in state count field 720 indicates that the entry represents a two-state state machine. In this example, field 750 is four bits in size with the most significant bit a sign bit, and is sign-extended to seven bits before calculating the prefetch address. Again, as an example, the index offset is limited from −8 lines to +8 lines, where each line is 64 bytes. Larger offsets result in the entry being released, e.g., recurring bit 710 is de-asserted and learning bit 715 is asserted in one embodiment. Thus, in one embodiment, field 750 is means for storing a transitional stride that is used as an index offset for a state-one-to-state-two transition.

State two count field 755 holds a state count value that is generating during the learning mode, i.e., learning bit 715 is asserted, and unchanged during the prediction mode, i.e., learning bit 715 is de-asserted. This value indicates, in prediction mode, how long to stay in state two before predicting a transition to state one. This field is valid only when the value stored in state count field 720 indicates this entry represents a two-state state machine. In this example, state-two count field 755 is three-bits in size. Thus, state two count field 755 stores means for indicating, in prediction mode, how long to stay in state two before predicting a transition to state one.

State-two-to-state-one offset field 760 stores a stride for a state-two-to-state-one transition, i.e., is an index offset used in prediction mode for a state-two-to-state-one transition. This field is valid only when the value stored in state count field 720 indicates this entry represents a two-state state machine. In this example, field 760 is four bits in size with the most significant bit a sign bit, and is sign-extended to seven bits before calculating the prefetch address. Again, as an example, the index offset is limited from −8 lines to +8 lines, where each line is 64 bytes. Larger offsets result in the entry being released, e.g., recurring bit 710 is de-asserted and learning bit 715 is asserted in one embodiment. Thus, in one embodiment, field 760 is means for storing a transitional stride that is used as an index offset for a state-two-to-state-one transition.

State-two-to-state-two offset field 765 stores a stride in a state-two-to-state-two transition, i.e., is an index offset used in prediction mode for a state-two-to-state-two transition. This field is valid only when the value stored in state count field 720 indicates this entry represents a two-state state machine. In this example, field 765 is four bits in size with the most significant bit a sign bit, and is sign-extended to seven bits before calculating the prefetch address. Yet again as an example, the index offset is limited from −8 lines to +8 lines, where each line is 64 bytes. Larger offsets result in the entry being released, e.g., recurring bit 710 is de-asserted and learning bit 715 is asserted in one embodiment. Thus, in one embodiment, field 765 is means for storing a stride that is used as an index offset for a state-two-to-state-two transition.

Current counter 770 is loaded with the state count value for a state when the state machine transitions to that state. In this example, counter 770 is decremented each time the offset is correct for that state.

As explained above, when a data cache miss occurs, it is unknown whether that miss is associated with a recurring miss pattern. Thus, training operation 420 trains an entry in index table 382 by checking whether the misses for the tag and thread number associated with the data cache misses fit the behavior of state machine 500.

Figure 8:
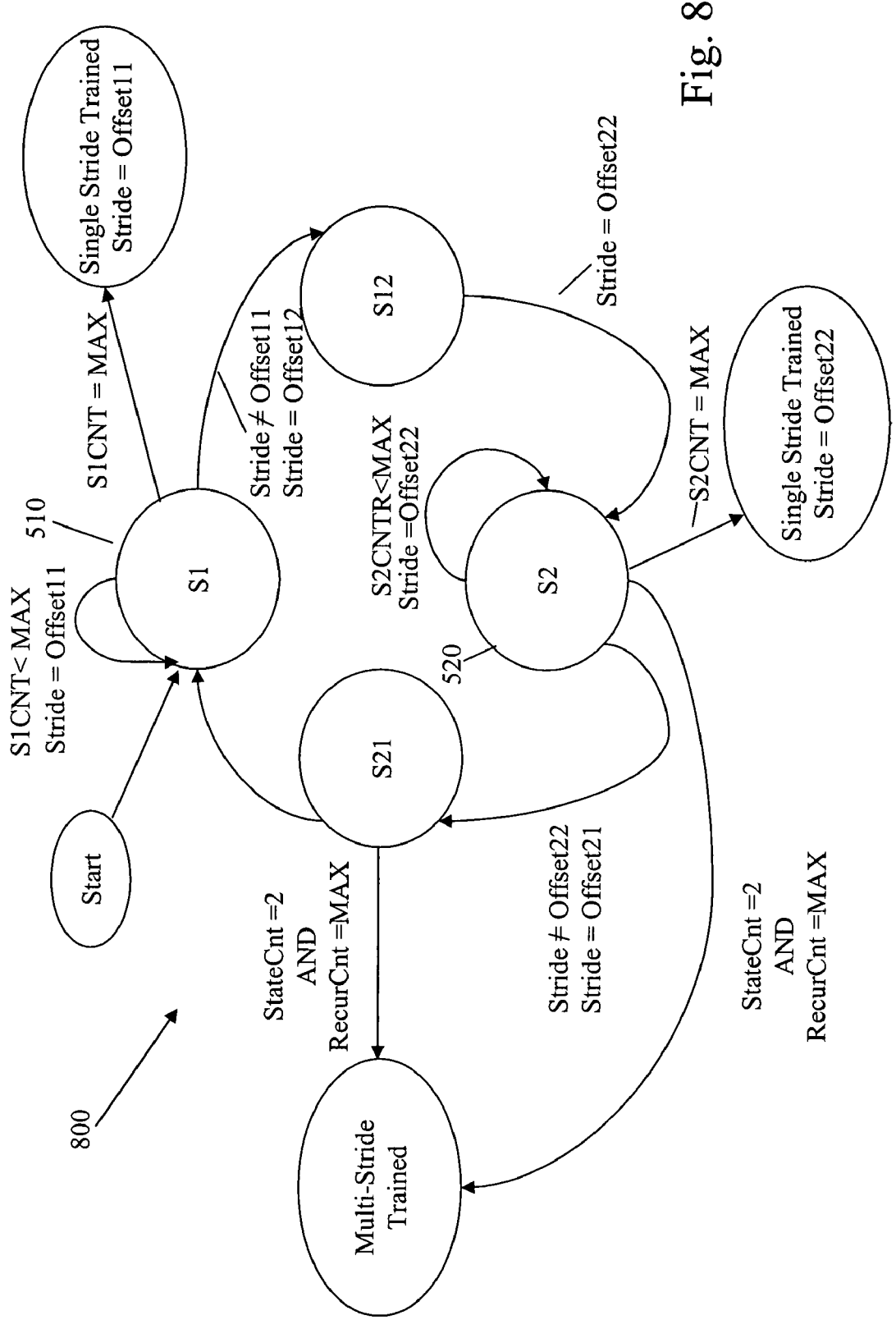
FIG. 8 is an illustration of a multi-stride state machine used in explaining the training of the multi-stride prefetcher according to one embodiment of the present invention.

FIG. 8 is an illustration of training states 800 for state machine 500. Training states 800 is an example of an implementation of training operation 420. In view of the above description of training operation 420 and state machine 500, the transitions and the conditions associated with each transition in training states 800 are not repeated and instead the above descriptions are incorporated herein by reference.

Nevertheless, briefly, when learning bit 710 is asserted for an entry in index table 382, the entry is in training. During training, a violation of either the state number or the index offset size, i.e., the current stride, results in the training being reinitialized for that stream. In this embodiment, the offset for a recurring prefetch table hit for a data cache miss is generated by subtracting the value in field LastIdx from the index in the miss line address.

As shown in FIG. 8, the transition from the training state to the prediction state happens when recurrent counter RecurCntr reaches its preset maximum for a multi-stride stream. Alternatively, the transition from the training state to the prediction state happens when either state one counter S1$cnt$ or state two counter S2$cnt$ reaches its preset maximum for a single-stride stream.

As an example of training operation 420, consider a sequence of indexes associated with addresses that have the same data cache tag. As illustrated in Table 1, ten misses with the same data cache tag are considered and index 312, for each miss is given in Column 2 of Table 1. Column 3 of Table 1 gives the index offset from the previous index 312 in Column 2, which also is the difference between index 312 and the value in Column LastIdx in the previous row of Table 1.

Table 1 illustrates how training operation 420 updates the index table entry.

On the next miss for this tag and thread number, miss three, training operation 420 updates the entry in index table 381, as illustrated in the corresponding row of Table 1, i.e., the row with "2" in column "Miss." Specifically bits R and L remain asserted; bit StateCnt remains de-asserted to represent a state machine with one state; recurrent counter RecurCntr remains at zero; field Offset11 remains set to 3; field S1$cnt$ is incremented to two; bit LastState remains configured to represent state one; last index field LastIdx is set to 0xd; and current counter CrtCntr remains at zero.

On the next miss for this tag and thread number, miss four, training operation 420 updates the entry in index table 381, as illustrated in the corresponding row of Table 1, i.e., the row with "3" in column "Miss." Specifically bits R and L remain asserted; bit StateCnt remains de-asserted to represent a state machine with one state; recurrent counter RecurCntr remains at zero; field Offset11 remains set to 3; field S1$cnt$ is incremented to three; bit LastState remains configured to represent state one; last index field LastIdx is set to 0x10; and current counter CrtCntr remains at zero.

On the next miss for this tag and thread number, miss five, training operation 420 updates the entry in index table 381, as illustrated in the corresponding row of Table 1, i.e., the row with "4" in column "Miss." Specifically bits R and L remain asserted; bit StateCnt is asserted to represent a state machine with two states; recurrent counter RecurCntr is remains at zero; field Offset11 remains set to 3; field S1$cnt$ remains at three; field Offset12 is set to 2; bit LastState is configured to represent state two; last index field LastIdx is set to 0x12; and current counter CrtCntr remains set at zero.

TABLE 1

Index Table Entry for D$ Tag

| MISS | INDEX | OFFSET | R | L | STATECNT | LASTIDX | LASTSTATE | RECURCNTR | S1 CNT | OFFSET 11 | OFFSET 12 | S2 CNT | OFFSET 21 | OFFSET 22 | CRTCNTR |
|---|---|---|---|---|---|---|---|---|---|---|---|---|---|---|---|
| 0 | 0x7  | —   | 1 | 1 | 0 | 0x7  | 0 | 0 | 0 | 0 | — | 0 | — | 0 | 0 |
| 1 | 0xA  | 0x3 | 1 | 1 | 0 | 0xA  | 0 | 0 | 1 | 3 | — | 0 | — | 0 | 0 |
| 2 | 0xD  | 0x3 | 1 | 1 | 0 | 0xD  | 0 | 0 | 2 | 3 | — | 0 | — | 0 | 0 |
| 3 | 0x10 | 0x3 | 1 | 1 | 0 | 0x10 | 0 | 0 | 3 | 3 | — | 0 | — | 0 | 0 |
| 4 | 0x12 | 0x2 | 1 | 1 | 1 | 0x12 | 1 | 0 | 3 | 3 | 2 | 0 | — | 0 | 0 |
| 5 | 0x15 | 0x3 | 1 | 1 | 1 | 0x15 | 1 | 0 | 3 | 3 | 2 | 1 | — | 3 | 0 |
| 6 | 0x18 | 0x3 | 1 | 1 | 1 | 0x18 | 1 | 0 | 3 | 3 | 2 | 2 | — | 3 | 0 |
| 7 | 0x19 | 0x1 | 1 | 1 | 1 | 0x19 | 0 | 1 | 3 | 3 | 2 | 2 | 1 | 3 | 3 |
| 8 | 0x1C | 0x3 | 1 | 1 | 1 | 0x1C | 0 | 1 | 3 | 3 | 2 | 2 | 1 | 3 | 2 |
| 9 | 0x1E | 0x2 | 1 | 1 | 1 | 0x1E | 0 | 0 | 0 | 0 | 0 | 0 | 0 | 0 | 0 |

For miss zero, allocate operation 410 creates the entry in index table 381 that is illustrated in the corresponding row of Table 1, i.e., the row with "0" in column "Miss." Specifically bits R and L are asserted; bit StateCnt is de-asserted to represent a state machine with one state; recurrent counter RecurCntr is set to zero; bit LastState is configured to represent state one; last index field LastIdx is set to 0x7; and the value of current counter CrtCntr is set zero.

On the next miss for this tag and thread number, miss two, training operation 420 updates the entry in index table 381, as illustrated in the corresponding row of Table 1, i.e., the row with "1" in column "Miss." Specifically bits R and L remain asserted; bit StateCnt remains de-asserted to represent a state machine with one state; recurrent counter RecurCntr remains at zero; field Offset11 is set to 3; field S1$cnt$ is incremented to one; bit LastState remains configured to represent state one; last index field LastIdx is set to 0xa.

The change in stride indicates that this may be a two-state state machine and so this is the first recurrence. If the stride had remained at three, the value of counter S1$cnt$ would have incremented to four ending the training phase and leaving the state count at one state, i.e., the state machine would be single-stride trained.

On the next miss for this tag and thread number, miss six, training operation 420 updates the entry in index table 381, as illustrated in the corresponding row of Table 1, i.e., the row with "5" in column "Miss." Specifically, bits R and L remain asserted; bit StateCnt remains asserted to represent a state machine with two states; recurrent counter RecurCntr remains at zero; field Offset11 remains set to 3; field S1$cnt$ remains at three; field Offset12 remains set to 2; field S2$cnt$ is incremented to one; field Offset22 is set to 3; bit LastState remains configured to represent state two; last index field LastIdx is set to 0x15; and current counter CrtCntr remains set at zero.

On the next miss for this tag and thread number, miss seven, training operation 420 updates the entry in index table 381, as illustrated in the corresponding row of Table 1, i.e., the row with "6" in column "Miss." Specifically bits R and L remain asserted; bit StateCnt remains asserted to represent a state machine with two states; recurrent counter RecurCntr remains at zero; field Offset11 remains set to 3; field S1*cnt* remains at three; field Offset12 remains set to 2; field S2*cnt* is incremented to two; field Offset22 remains set to 3; bit LastState remains configured to represent state two; last index field LastIdx is set to 0x18; and current counter CrtCntr remains set at zero.

On the next miss for this tag and thread number, miss eight, training operation 420 updates the entry in index table 381, as illustrated in the corresponding row of Table 1, i.e., the row with "7" in column "Miss." Specifically bits R and L remain asserted; bit StateCnt remains asserted to represent a state machine with two states; recurrent counter RecurCntr is set to one; field Offset11 remains set to 3; field S1*cnt* remains at three; field Offset12 remains set to 2; field S2*cnt* remains at two; field Offset22 remains set to 3; field Offset21 is set to one; bit LastState is configured to represent state one; last index field LastIdx is set to 0x19; and current counter CrtCntr is set three, the value in field S1*cnt*.

On the next miss for this tag and thread number, miss nine, training operation 420 updates the entry in index table 381, as illustrated in the corresponding row of Table 1, i.e., the row with "8" in column "Miss." Specifically bits R and L remain asserted; bit StateCnt remains asserted to represent a state machine with two states; recurrent counter RecurCntr remains at one; the value of three in field Offset11 is checked against the current offset of three; field S1*cnt* remains at three; field Offset12 remains set to 2; field S2*cnt* remains at two; field Offset22 remains set to 3; field Offset21 remains set to one; bit LastState is set to represent state one; last index field LastIdx is set to 0x1C; and current counter CrtCntr is decremented to two.

On the next miss for this tag and thread number, miss ten, training operation 420 detects that updates the entry in index table 381, as illustrated in the corresponding row of Table 1, i.e., the row with "9" in column "Miss." Specifically, the training failed, because an offset of three was expected, but an offset of two occurred. Thus, the stream does not have a recurring pattern of misses up to this time. Thus, the entry is re-initialized, and a search for a recurrent pattern for this tag and thread number is started again.

In this embodiment, when the training is completed successfully, a burst of N prefetches are done. Subsequent prefetches are triggered by recurring prefetch table 380 when the stored tag and thread number in an entry of stream table 381 matches the load miss address' tag and thread number.

As described above, other implementations of multi-stride prefetcher 350 are possible. For example, a single prefetch on each data cache miss for which there is a corresponding entry in recurring prefetch table 380. Alternatively, prefetches are generated on data cache hits on prefetched line specially tagged, as described more completely below. In this implementation, there will not be subsequent misses for the stream as long as the prediction is correct.

On a tag match for a valid recurring prefetch table entry with learning bit L de-asserted, a prefetch is launched for a number of data cache lines. As an example, the number of data cache lines prefetched is four.

The address of the first prefetch is the matching tag with the proper index offset. This offset is a function of the value in field LastState, and the value of current counter CrtCntr, as follows:

i) If the last state is state one and the value of counter CrtCntr is not equal to zero (There is an error if the value of counter CrtCntr is greater than the value in field S1*cnt*.), entry is in state one, and so the index offset equals the value in field Offset11; counter CrtCntr is decremented; and field LastState is configured for state one;

ii) If the last state is state one and the value of counter CrtCntr is equal to zero, entry is in state one but transitioning to state two, and so the index offset equals the value in field Offset12; counter CrtCntr is loaded with the value in field S2*cnt*; and field LastState is configured for state two;

iii) If the last state is state two and the value of counter CrtCntr is not equal to zero (There is an error if the value of counter CrtCntr is greater than the value in field S2*cnt*.), entry is in state two, and so the index offset equals the value in field Offset22; counter CrtCntr is decremented; and field LastState is configured for state two; and iv) If the last state is state two and the value of counter CrtCntr is equal to zero, entry is in state two but transitioning to state one, and so the index offset equals the value in field Offset21; counter CrtCntr is loaded with the value in field S1*cnt*; and field LastState is configured for state one.

Once the first prefetch of a burst is issued, the tag for that address also goes through recurring prefetch table 380 to get the offset of the next prefetch in the burst. Two possibilities for continued processing are:

i) Stop the burst in case of a prefetch hit in the data cache; and ii) Continue the burst in case of a prefetch hit in the data cache.

In one embodiment, the second option is implemented.

In one embodiment, a data cache line updated by a first prefetch is tagged as such in the data cache. A load hitting this data cache line sends the address and thread number of the load to multi-stride prefetcher 350. If there is a match of the tag and thread number in stream table 381, the next four lines, in this example, are prefetched into the data cache. This allows the start of prefetching the next lines before all the previously prefetched lines are consumed.

Thus, method 400 with FIGS. 1, and 3 to 8 describe, in one embodiment, a multi-stride prefetcher including means for determining upon a cache miss whether a tag in an address for which said cache miss corresponds matches a stored tag in a recurring prefetch table; and means for generating a prefetch address upon said means for determining finding an entry in said recurring prefetch table having said stored tag and a prediction state associated with that entry.

The multi-stride prefetcher further includes means for allocating a new entry in said recurring prefetch table upon said means for determining failing to find an entry in said recurring prefetch table having said stored tag; and means for updating training for an entry having said stored tag upon said means for determining finding said entry in said recurring prefetch table having said stored tag and a learning state associated with that entry. The means for generating also includes means for using said tag and an index offset from said recurring prefetch table.

In another embodiment, a multi-stride prefetcher includes a means for determining upon a cache miss whether a tag, in an address for which said cache miss corresponds, matches a stored tag in an entry of a recurring prefetch table; a means for training of the entry upon finding the entry by said means for determining, if the entry is in the learning mode; and a means for issuing a prefetch upon finding the entry by said means for determining, if the entry has finished training.

In one embodiment, processor 911 with multi-stride prefetcher 350A is included in a hardware configuration 910 like a personal computer or workstation. In this embodiment, the applications and operating system(s) are included in memory 912 or a memory coupled to processor 911 via the Internet for example. Hardware configuration 910 includes, but is not limited to, an I/O interface 914, a display 916, a keyboard 915, and a mouse 918. In this example, computer system 910 includes a support circuit 913 that in turn includes a processor with multi-stride prefetcher 350B.

However, in another embodiment, system 910 is part of a client-server computer system 900. In this embodiment, server system 980 includes a processor 982 with multi-stride prefetcher 350C, as well as a display 981, memory 985, a support circuit 984 with a processor including multi-stride prefetcher 350D and a network interface 983 that also includes a processor with a multi-stride prefetcher 350E.

Figure 9:
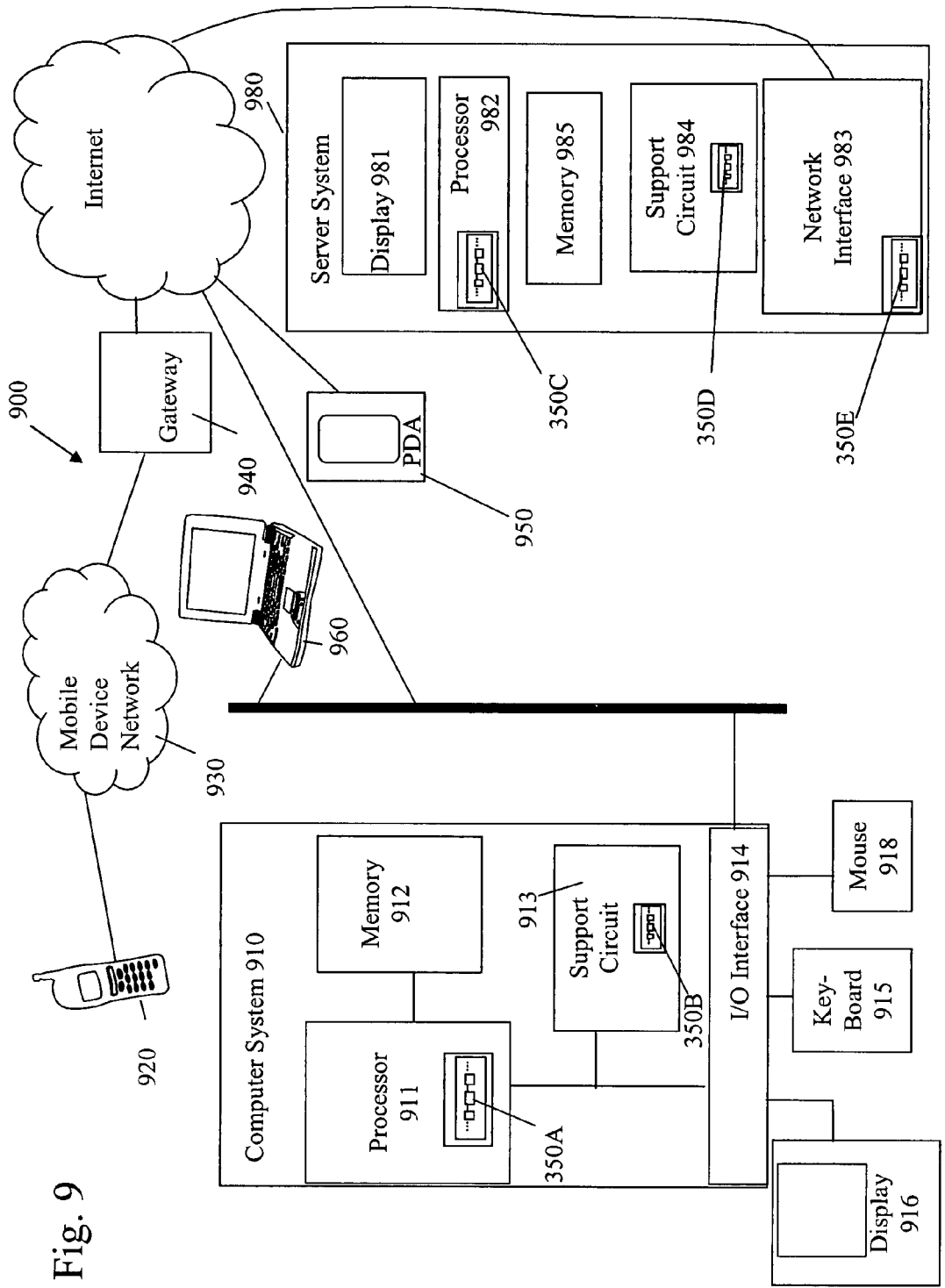
FIG. 9 is an example of systems that utilize the multi-stride prefetcher according to one embodiment of the present invention.

For either a client-server computer system 900 or a stand-alone computer system 910, memory 912 typically includes both volatile memory, such as main memory, and non-volatile memory, such as hard disk drives. While memory 912 is illustrated as a unified structure in FIG. 9, this should not be interpreted as requiring that all memory in memory 912 be at the same physical location. All or part of memory 912 can be in a different physical location than processor 911.

More specifically, multi-stride prefetcher 350, in one embodiment, can be included in a portable computer, a workstation, a server computer, or any other device that utilizes a cache. Similarly, in another embodiment, system 900 can be comprised of multiple different computers, wireless devices, server computers, or any desired combination of these devices that are interconnected to perform the operations, as described herein.

Herein, a computer memory refers to a volatile memory, a non-volatile memory, or a combination of the two. Similarly, a computer input unit 915, 918 and a display unit 916 refer to the features providing the required functionality to input the information described herein, and to display the information described herein, respectively, in any one of the aforementioned or equivalent devices.

In view of this disclosure, the multi-stride prefetcher functionality can be implemented in a wide variety of computer system configurations that include a chip having both a processor and a data cache using an operating system and computer programming language of interest to the user.

While the multi-stride prefetcher hereinbefore has been explained in connection with one embodiment thereof, those skilled in the art will readily recognize that modifications can be made to this embodiment without departing from the spirit and scope of the present invention.

We claim:

1. A processor comprising:
   a cache; and
   a multi-stride prefetcher coupled to said cache,
   wherein said multi-stride prefetcher fetches information into said cache for both (1) a stream of cache misses with a plurality of strides wherein said plurality of strides includes valid different strides for different portions of said stream and (2) another stream of cache misses having a single stride, and further wherein said valid different strides for different portions of said stream includes a first valid stride for a first portion of said stream, and a second valid stride for a second different portion of said stream wherein said first and second valid strides exist simultaneously,
   said multi-stride prefetcher further comprising:
      a state machine implementation having a plurality of states for prefetching said stream with said plurality of strides, wherein said state machine implementation comprises:
         said first valid stride associated with a first state of said states; and
         said second valid stride associated with a second state of said states wherein said first and second states are different states.

2. The processor of claim 1 wherein said cache comprises a data cache.

3. The processor of claim 1 wherein said plurality of states comprises two states.

4. The processor of claim 1 wherein said multi-stride prefetcher comprises:
   a recurring prefetch table wherein at least one entry of said recurring prefetch table includes at least said first and second valid strides.

5. The processor of claim 4 wherein said recurring prefetch table comprises a stream table wherein said stream table includes an entry corresponding to said at least one entry of said recurring prefetch table.

6. The processor of claim 5 wherein said stream table is implemented in a content-addressable memory.

7. The processor of claim 5 wherein said stream table is implemented in a set associative memory.

8. The processor of claim 5 wherein said stream table further comprises:
   a valid field; and
   a tag field.

9. The processor of claim 8 wherein said tag field stores a tag from a virtual address.

10. The processor of claim 8 wherein said tag field stores a tag from a physical address.

11. The processor of claim 5 wherein said recurring prefetch table comprises an index table including said at least one entry of said recurring prefetch table including said at least said first and second valid strides.

12. The processor of claim 11 wherein said index table comprises fields for storing information characterizing said state machine implementation.

13. The processor of claim 12 wherein said information includes information characterizing said stream having said single stride.

14. The processor of claim 12 wherein said information includes information characterizing said states.

15. The processor of claim 12 wherein said fields include a learning bit.

16. A multi-stride prefetcher comprising:
   a recurring prefetch table coupled to a tag field of an address stored in a storage element wherein at least one entry of said recurring prefetch table includes states, for a stream, corresponding to valid different strides for different portions of said stream,
   wherein said valid different strides for different portions of said stream includes a first valid stride for a first portion of said stream, and a second valid stride for a second different portion of said stream;
   said first and second valid strides exist simultaneously;
   said first valid stride is associated with a first state of said states; and said second valid stride is associated with a second state of said states wherein said first and second states are different states;
   an adder comprising:
      a first input coupled to an index field of said address;
      a second input coupled to said recurring prefetch table; and
      an output; and
   a prefetch address storage element comprising:
      a prefetch tag field coupled to said tag field; and
      an index field coupled to said output of said adder.

17. The multi-stride prefetcher of claim 16 wherein said recurring prefetch table comprises.

18. The multi-stride prefetcher of claim 17 wherein said stream table is implemented in a content-addressable memory.

19. The multi-stride prefetcher of claim 17 wherein said stream table is implemented in a set associative memory.

20. The multi-stride prefetcher of claim 17 wherein said stream table further comprises:
   a valid field; and
   a tag field.

21. The multi-stride prefetcher of claim 20 wherein said tag field stores a tag from a virtual address.

22. The multi-stride prefetcher of claim 20 wherein said tag field stores a tag from a physical address.

23. The multi-stride prefetcher of claim 16 wherein said recurring prefetch table comprises an index table including said at least one entry of said recurring prefetch table.

24. The multi-stride prefetcher of claim 23 wherein said index table comprises fields for storing information characterizing a state machine including said states.

25. The multi-stride prefetcher of claim 24 wherein said information includes information characterizing a stream having a single stride.

26. The multi-stride prefetcher of claim 24 wherein said information includes information characterizing said two states.

27. The multi-stride prefetcher of claim 24 wherein said fields include a learning bit.

28. The multi-stride prefetcher of claim 24 wherein said fields include a last index field.

29. A multi-stride prefetcher comprising:
   a recurring prefetch table coupled to a tag field of an address stored in a storage element and a thread number stored in a storage element, said recurring prefetch table comprising:
      an index table wherein said index table includes at least one entry including states, for prefetching a stream, corresponding to valid different strides for different portions of said stream,
         wherein said valid different strides for different portions of said stream includes a first valid stride for a first portion of said stream, and a second valid stride for a second different portion of said stream;
      said first and second valid strides exist simultaneously;
      said first valid stride is associated with a first state of said states; and
      said second valid stride is associated with a second state of said states wherein said first and second states are different states; and
   a stream table wherein said stream table includes an entry corresponding to said at least one entry of said recurring prefetch table an adder comprising:
      a first input coupled to an index field of said address;
      a second input coupled to said index table; and
      an output; and
   a prefetch address storage element comprising:
      a prefetch tag field coupled to said tag field; and
      an index field coupled to said output of said adder.

30. A method for multi-stride prefetching comprising:
determining, upon a cache miss, whether a tag, in an address for which said cache miss corresponds, matches a stored tag in an entry in a recurring prefetch table wherein said address includes said tag, an index and an offset and further wherein said recurring prefetch table includes at least one entry including states, for prefetching a stream, corresponding to valid different strides for different portions of said stream,
   wherein said valid different strides for different portions of said stream includes a first valid stride for a first portion of said stream, and a second valid stride for a second different portion of said stream;
   said first and second valid strides exist simultaneously;
   said first valid stride is associated with a first state of said states; and
   said second valid stride is associated with a second state of said states wherein said first and second states are different states;
generating a prefetch address upon said determining finding an entry in said recurring prefetch table having said stored tag and a prediction state associated with that entry; and
storing said prefetch address in a storage element.

31. The method of claim 30 further comprising:
allocating a new entry in said recurring prefetch table upon said determining failing to find an entry in said recurring prefetch table having said stored tag.

32. The method of claim 30 further comprising:
updating training for an entry having said stored tag upon said determining finding said entry in said recurring prefetch table having said stored tag and a learning state associated with that entry.

33. The method of claim 30 wherein said generating further comprises:
using said tag and an index offset from said recurring prefetch table in said generating.

34. A method comprising:
determining, upon a cache miss, whether a tag, in an address for which said cache miss corresponds, matches a stored tag in an entry of a recurring prefetch table;
training of the entry upon finding the entry in said determining, if the entry is in the learning mode, wherein said training characterizes states, for prefetching a stream, corresponding to valid different strides for different portions of said stream,
   wherein said valid different strides for different portions of said stream includes a first valid stride for a first portion of said stream, and a second valid stride for a second different portion of said stream;
   said first and second valid strides exist simultaneously;
   said first valid stride is associated with a first state of said states; and
   said second valid stride is associated with a second state of said states wherein said first and second states are different states; and
issuing a prefetch upon finding the entry in said determining, if the entry has finished training.

35. A multi-stride prefetcher comprising:
  means, performed by a processor, for determining, upon a cache miss, whether a tag, in an address for which said cache miss corresponds, matches a stored tag in an entry in a recurring prefetch table wherein said address includes said tag, an index and an offset and further wherein said recurring prefetch table includes at least one entry including states, for prefetching a stream, corresponding to valid different strides for different portions of said stream,
    wherein said valid different strides for different portions of said stream includes a first valid stride for a first portion of said stream, and a second valid stride for a second different portion of said stream;
    said first and second valid strides exist simultaneously;
      said first valid stride is associated with a first state of said states; and
      said second valid stride is associated with a second state of said states wherein said first and second states are different states; and
  means, performed by a processor, for generating a prefetch address upon said means for determining finding an entry in said recurring prefetch table having said stored tag and a prediction state associated with that entry.

36. The multi-stride prefetcher of claim 35 further comprising:
  means, performed by a processor, for allocating a new entry in said recurring prefetch table upon said means for determining failing to find an entry in said recurring prefetch table having said stored tag.

37. The multi-stride prefetcher of claim 35 further comprising:
  means, performed by a processor, for updating training for an entry having said stored tag upon said means for determining finding said entry in said recurring prefetch table having said stored tag and a learning state associated with that entry.

38. The multi-stride prefetcher of claim 35 wherein said means for generating further comprises:
  means, performed by a processor, for using said tag and an index offset from said recurring prefetch table.

39. A multi-stride prefetcher comprising:
  means, performed by a processor, for determining, upon a cache miss, whether a tag, in an address for which said cache miss corresponds, matches a stored tag in an entry of a recurring prefetch table;
  means, performed by a processor, for training of the entry upon finding the entry by said means for determining, if the entry is in the learning mode, wherein said training characterizes states, for prefetching a stream, corresponding to valid different strides for different portions of said stream,
    wherein said valid different strides for different portions of said stream includes a first valid stride for a first portion of said stream, and a second valid stride for a second different portion of said stream;
    said first and second valid strides exist simultaneously;
      said first valid stride is associated with a first state of said states; and
      said second valid stride is associated with a second state of said states wherein said first and second states are different states; and
  means, performed by a processor, for issuing a prefetch upon finding the entry by said means for determining, if the entry has finished training.

* * * * *

UNITED STATES PATENT AND TRADEMARK OFFICE
CERTIFICATE OF CORRECTION

PATENT NO. : 7,487,296 B1
APPLICATION NO. : 11/062266
DATED : February 3, 2009
INVENTOR(S) : Sorin Iacobovici, Sudarshan Kadambi and Yuan C. Chou It is certified that error appears in the above-identified patent and that said Letters Patent is hereby corrected as shown below:

In Column 20, Line 39, Claim 11, replace "Claim 5" with --Claim 4--;
In Column 21, Line 13, Claim 17, after "comprises" insert --a stream table--.

Signed and Sealed this

Nineteenth Day of January, 2010

David J. Kappos
*Director of the United States Patent and Trademark Office*